(12) United States Patent
Baskin (10) Patent No.: US 11,294,402 B1
(45) Date of Patent: Apr. 5, 2022

(54) SEGMENTED FLUID END ASSEMBLY (71) Applicant: CS&P Technologies LP, Cypress, TX (US)

(72) Inventor: Kennis Baskin, Cypress, TX (US)

( * ) Notice: Subject to any disclaimer, the term of this patent is extended or adjusted under 35 U.S.C. 154(b) by 323 days.

(21) Appl. No.: 16/715,240

(22) Filed: Dec. 16, 2019

Related U.S. Application Data (60) Provisional application No. 62/869,320, filed on Jul. 1, 2019.

(51) Int. Cl.
| | | |
|---|---|---|
| *F04B 53/16* | (2006.01) | |
| *G05D 7/06* | (2006.01) | |
| *F04B 53/00* | (2006.01) | |
| *F15B 13/08* | (2006.01) | |
| *F16L 41/02* | (2006.01) | |
| *F16K 27/00* | (2006.01) | |
| *E21B 43/26* | (2006.01) | |

(52) U.S. Cl.
CPC ......... *G05D 7/0664* (2013.01); *F04B 53/007* (2013.01); *F04B 53/16* (2013.01); *F15B 13/0817* (2013.01); *F16K 27/003* (2013.01); *F16L 41/021* (2013.01); *E21B 43/26* (2013.01); *Y10T 137/87885* (2015.04)

(58) Field of Classification Search
CPC ...................... Y10T 137/87885; F16L 41/021; F04B 53/16; F16K 27/003
USPC .................................. 417/454; 285/305, 308
See application file for complete search history.

(56) References Cited

U.S. PATENT DOCUMENTS

| | | | | |
|---|---|---|---|---|
| 6,123,302 A | * | 9/2000 | Taylor ...................... | B05C 5/02 |
| | | | | 248/231.61 |
| 6,231,260 B1 | * | 5/2001 | Markulec ............... | F16K 27/003 |
| | | | | 403/24 |
| 7,278,550 B2 | * | 10/2007 | Bezema .................... | B05C 5/02 |
| | | | | 137/884 |
| 7,296,706 B2 | * | 11/2007 | Raterman ............... | B05C 5/027 |
| | | | | 222/1 |
| 7,341,435 B2 | | 3/2008 | Vicars | |
| 7,874,316 B2 | * | 1/2011 | Okabe ................... | F16K 27/003 |
| | | | | 137/884 |
| 8,465,268 B2 | | 6/2013 | Baxter | |
| 8,573,259 B2 | * | 11/2013 | Burns ............... | B01L 3/502715 |
| | | | | 137/833 |
| 9,243,630 B2 | | 1/2016 | Foote | |
| 9,732,746 B2 | | 8/2017 | Chandrasekaran | |
| 9,739,130 B2 | | 8/2017 | Young | |
| 10,184,470 B2 | | 1/2019 | Barnett, Jr. | |
| 10,221,847 B2 | | 3/2019 | Dyer | |
| 2006/0002806 A1 | | 1/2006 | Baxter | |

(Continued)

*Primary Examiner* — Kevin F Murphy
(74) *Attorney, Agent, or Firm* — Egbert, McDaniel & Swartz, PLLC (57) ABSTRACT

A segmented fluid end assembly has a first module having a body with a first side surface and a slot formed therein and extending along at least a portion of the first side surface, a second module having a body with a first side surface and having a slot formed in the first side surface and generally aligned with the slot of the first module, and a connector received in the slots of the first and second module so as to fix the first module against the second module. The connector is in the nature of a wedge. Each of the slots has a generally dovetail configuration. The wedge has a generally hourglass cross-section. The wedge is engaged in friction-fit relationship in the slots.

15 Claims, 4 Drawing Sheets

(56) References Cited

U.S. PATENT DOCUMENTS

| | | |
|---|---|---|
| 2011/0206546 A1 | 8/2011 | Vicars |
| 2017/0114780 A9 | 4/2017 | Skurdalsvold |
| 2019/0128104 A1* | 5/2019 | Graham ................ E21B 43/267 |
| 2019/0145403 A1 | 5/2019 | Blume |

* cited by examiner

SEGMENTED FLUID END ASSEMBLY

RELATED U.S. APPLICATIONS

The present application claims priority from U.S. Provisional Patent Application Ser. No. 62/869,320, filed on Jul. 1, 2019, and entitled "Segmented Fluid End Assembly".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to fluid end assemblies that are used in association with fracturing operations. More particularly, the present invention relates to segmented fluid ends where there are a plurality of replaceable modules that are joined together.

2. Description of Related Art Including Information Disclosed Under 37 CFR 1.97 And 37 CFR 1.98

Hydraulic fracturing is the injection, under pressure, of water, sand, and/or other fluids within a well formation to induce fractures in a rock layer. Oil and gas drilling operators commonly use hydraulic fracturing, (or "fracking") to release petroleum and natural gas well as other substances from the rock layer. The high pressure injection creates new channels in the rock which can increase the extraction rates and ultimate recovery of fossil fuels. A hydraulic fracturing pump or "frac pump" is used to pump water, sand, gravel, acids, proprietary liquids and concrete into the well formation. The solids pumped down the hole into the fractures keep the fractures from closing after the pressure is released. Operators generally attempt to pump as much volume as possible at or above the pressure necessary to frac the well.

Fracking gas or oil wells is very expensive and generally charged by the hour. Because the formation may be located thousands of feet below the earth's surface, the pressures generated and required by frac pumps are substantial, sometimes exceeding 20,000 pounds per square inch (p.s.i.). At peak times, a given frac pump may operate for more than eight consecutive hours (with drive engines running) at as much as 2800 revolutions per minute (rpm). With gear changes, the pump generally runs between a low of 60 rpm to a high of as much as 300 rpm.

A frac pump comprises two major components: a power frame and a fluid end. The power frame and fluid end are held together by a group of stay rods. The power frame is driven by high horsepower diesel engines, electric motors, or turbine engines. Internally, a frac pump increases pressure within a fluid cylinder by reciprocating a plunger longitudinally within the fluid end cylinder. Conventional high pressure, high volume frac pumps have either three or five cylinders. Other designs may have more or fewer cylinder counts.

The fluid ends of hydraulic or well stimulation pumps must produce enormous pressure and move a large volume of abrasive fluid that is high in solids content. Frac pumps were originally designed for intermittent service of six to eight hours per day. Today's pumps operate many more hours per day, and require much more maintenance than ever before.

A conventional fluid end comprises a block of steel comprising a plunger opening and compression area, intake and pressure valves with an intake path for supply of media to the plunger area and an exit path, internally connected to the compression chamber, for the pressurized fluid transfer. The vast majority of conventional frac pump fluid ends are "mono blocks". A mono block is machined from a single piece of material weighing approximately 4500-8000 lbs. Recently, segmented fluid ends have been introduced in which the block is divided into a number of pieces corresponding to the number of cylinders. For example, a three cylinder fluid end ("triplex") in such a conventional segmented fluid end comprises three segments and a five cylinder fluid end "quint" comprises five segments. Each segment of such segmented fluid ends comprises a single block of material. The design and maintenance of the conventional one piece segmented fluid end is virtually no different than the design or maintenance of the conventional mono block.

After extended periods of use all fluid ends, either the mono block or the one piece segmented head become worn or cracked and have many hours of downtime due to the many pressure and intake valve changes through the life of the one piece construction of the fluid ends.

Maintenance demand of the mono block or solid block head design produces a great deal of downtime. Loss of a single cylinder of the mono block or one piece head requires a complete replacement at great financial cost. Maintenance and repair creates machine downtime and increases the overall cost of oil and gas production. In order to repair a conventional mono block fluid end, the fracking trailer must be transported to a repair facility and the entire fluid end (mono block or solid piece fluid end) must be removed from the pump with overhead cranes or fork lifts, disassembled, repaired or replaced. No disassembly of the one piece head assembly can be performed in the field. The entire assembly has to be removed, no different than the mono block, because of design and weight. Only valve changes, plunger and packing changes can be performed in the field. Even with conventional segmented fluid ends, repairing a failed segment requires disassembly of the entire fluid end assembly, removing the affected segment comprising the plunger, one piece segment, intake valve, pressure valve and front access discharge cover. This front cover gives the required access to the intake valve, seat, valve spring and can hold the intake valve spring retainer. With the existing segmented designs, the loss of the intake or pressure valve or a worn or cracked manifold area requires the replacement of the entire segment. Such repair activities are costly and time consuming.

Due to the long rebuild turnaround, operation under less than ideal conditions, and high maintenance costs, frac pump owners inevitably must "over-buy" fracking units (at a cost of millions of dollars per unit) to compensate for the number of pumps that are constantly out of service.

In the past, various patents have issued relating to such fluid end assemblies. For example, U.S. Pat. No. 7,341,435, issued on Mar. 11, 2008 to B. L. Vicars, teaches a fluid end for a high-pressure pump. This fluid end includes a unitary body with a plurality of horizontal passages each for receiving a reciprocating plunger at one of its ends and a pressure relief valve at the other of its ends. The body is provided with a corresponding number of vertical passages each of which intersect one of the horizontal passages and contains a suction valve at its bottom and a discharge valve at its top. A suction manifold is hingedly attached to the bottom of the body to provide a flow of fluid into the body via the suction valves. A discharge passage intersects the vertical passages and receives fluid pressurized by the plungers via discharge valves and ports.

U.S. Pat. No. 8,465,268, issued on Jun. 18, 2013 to Baxter et al., describes a modular fluid end for a multiplex plunger pump. Each of the modules is machined from a single-piece steel forging with a plunger bore intersected by a linear section/discharge bore and pumped fluid is discharged straight out through a top of the module into a discharge manifold. A compression clamp applies a crush load to opposed sides of the modules in order to extend service life.

U.S. Pat. No. 9,243,630, issued on Jan. 26, 2016 to E. Foote, discloses a segmented fluid end for high-pressure plunger pumps. One segmented fluid end includes one or more fluid end modules. Each fluid end module includes a body having a plunger bore configured to receive a plunger therein and a discharge outlet in fluid communication with the plunger bore. A pressurized working fluid may exit the body of each fluid end module via the discharge outlet. A discharge manifold having an elongate manifold body is operatively coupled to each fluid end module.

U.S. Pat. No. 9,732,746, issued on Aug. 15, 2017 to Chandrasekaran et al., teaches a fluid end for a high-pressure plunger pump. This fluid end includes a casing defining a plurality of working spaces that each include an inlet bore, an outlet bore, a plunger bore, and a valve cover bore. The bores define a cross bore intersection space and an inlet bore transition area at the intersection of the inlet bore and the cross bore intersection space. A first V-shaped groove and a second V-shaped groove are formed adjacent the inlet bore transition area with each extending partially around the inlet bore axis.

U.S. Pat. No. 9,739,130, issued on Aug. 22, 2017 to F. Young, provides a fluid end for a high-pressure reciprocating pump. This fluid end has a body having a first bore for receiving a reciprocating plunger, a second bore for accommodating a suction valve, and a third bore for accommodating a discharge valve. The second bore and the third bore are perpendicular to the first bore. There is at least one tubular sleeve in the first bore and at least one tubular cartridge in the second bore or third bore. A fluid-tight seal is located between contacting surfaces of the sleeve and the cartridge.

U.S. Pat. No. 10,184,470, issued on Jan. 22, 2019 to W. H. Barnett, shows a segmented fluid end having a plurality of fluid end segments. Each of the fluid end segments comprises a plunger manifold, an intake head, and a pressure head. The fluid end comprises three fluid end segments or five fluid end segments. The plunger manifold has first and second mounting surfaces with each having a fluid opening. An intake head mounting plant is adapted to be removably coupled to the first mounting surface and a pressure head mounting flat is adapted to be removably coupled to the second mounting surface. A plunger manifold has a plunger mounting member having a plunger opening adapted to receive a plunger. The pressure heads are adapted for cooperative coupling to adjacent pressure heads such that, when coupled, the pressure heads are in fluid communication with one another.

U.S. Pat. No. 10,221,847, issued on Mar. 5, 2019 to D. F. Dyer, describes a suction block for use in a fluid end assembly of a high-pressure reciprocal pump. The suction block includes a first suction bore extending from a first face of the suction block and into an interior thereof and a second suction bore extending from a second face of the suction block and into the interior thereof so as to intersect the first suction bore. The second suction bore is adapted to receive a valve assembly for alternatively fluidly connecting and disconnecting the first and second suction bores.

U.S. Patent Application Publication No. 2006/0002806, published on Jan. 5, 2006 to Baxter et al., teaches a fluid end for a reciprocating pump. This fluid end has a body having a base, a side and a longitudinal opening side. A cylinder bore is formed horizontally through the body and a vertical bore intersects the cylinder bore so as to define a high stress region at the intersection. A tension member extends through the body substantially parallel to the longitudinal axis of the body. The tension member provides a compressive load on the body so as to reduce the stresses encountered in the region during operation of the fluid end.

U.S. Patent Application Serial No. 2011/0206546, issued on Aug. 25, 2011 to B. L. Vicars, discloses a fluid end assembly having a pump housing with a number of interior passages for the flow of fluids. The housing has a plunger bore with a closed inner end and an open outer end. A suction passage intersects the plunger bore. A discharge passage intersects both the suction bore and the suction passage such that the discharge passage, the suction passage, and the plunger bore radiate outwardly from their point of intersection to define a Y-shape. A connector passage branches from the discharge passage. An outlet passage intersects the connector passage and passes through the pump housing at right angles to the plunger bore. A reciprocating plunger is located in the plunger bore.

U.S. Patent Application Publication No. 2017/0114780, published on Apr. 27, 2017 to Skurdalsvold et al., provides a fluid end block for attachment to a power end of a high-pressure reciprocating pump. This fluid end block includes a main body portion having an outwardly facing forward face, an outwardly facing rear face and opposing side surfaces. A web portion protrudes outwardly from the outwardly facing forward face. A plurality of bosses protrude from the web.

U.S. Patent Application Publication No. 2019/0145403, published on May 16, 2019 to J. H. Bloume, discloses a pump with a segmented fluid end housing and an in-line valve. The suction valve and the seat are aligned with the plunger. The fluid end housing is constructed with multiple modules. The modules are held in a rigid assembly by staybolts that connect to the power end of the plunger pump. The staybolts pass through bores in the central fluid module and the suction seat module and are bound by a conventional threaded nut. Packing box modules are bound to the central fluid module by bolts that also pass through separate bores in the same central module. A suction valve spring retainer/plunger spacer within the plunger bore of the assembly shields the intersection of the plunger bore and the discharge bore from destructive erosion damage.

Figure 1:
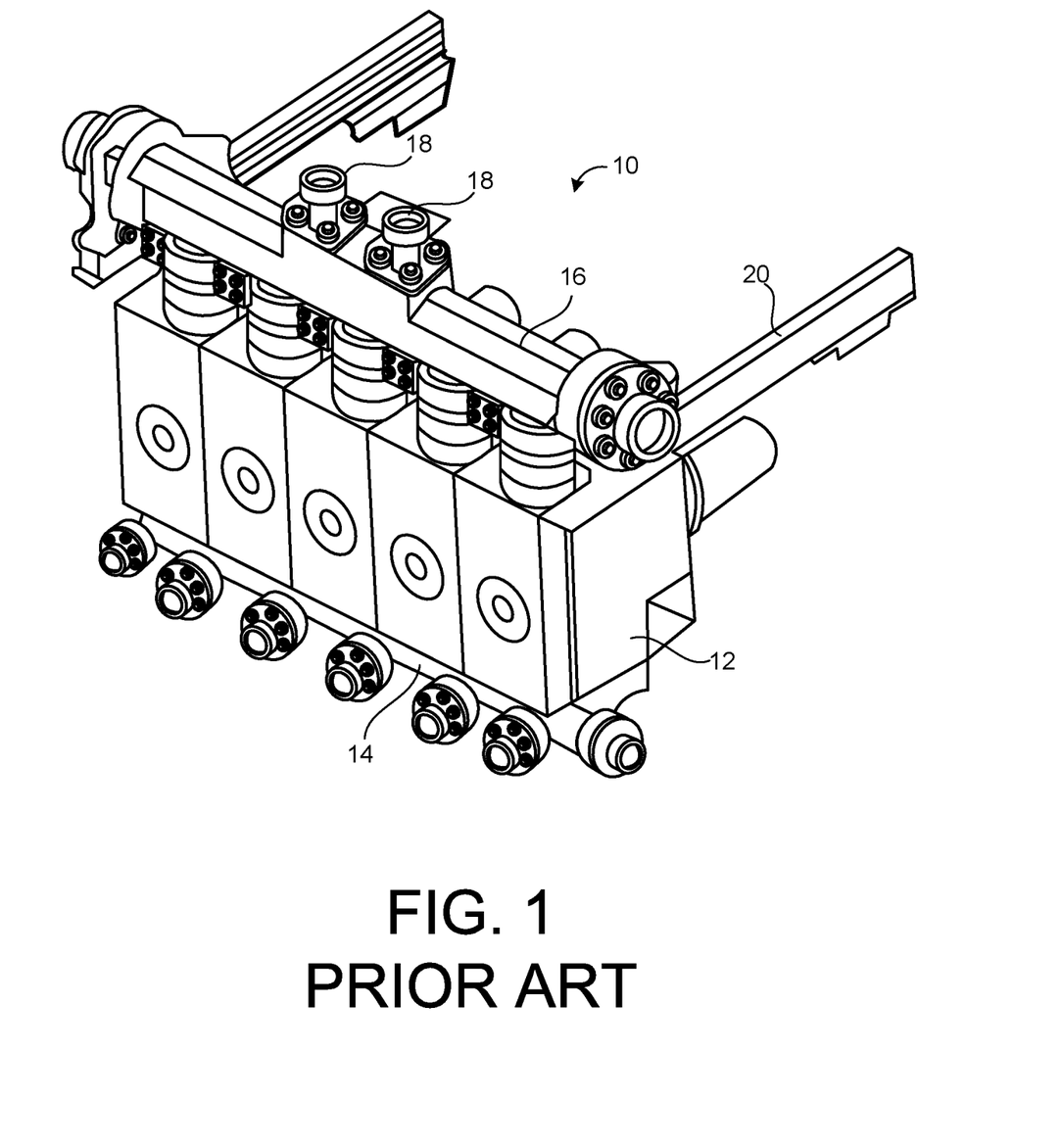
FIG. 1 is a perspective view of a prior art segmented fluid end assembly.

FIG. 1 shows a segmented fluid end assembly 10 as previously sold by the present Applicant. This fluid end assembly 10 includes a plurality of individual fluid end segments 12 that are joined in side-by-side relationship. A suction manifold 14 is located at the bottom of the individual fluid end segments 12. A discharge manifold 16 is in fluid communication with a fluid end segments 12 and extends across a top of the fluid end segments 12. Pressure transducer/relief valve ports 18 are cooperative with the common discharge manifold 16. A service rail 20 is configured so as to support the fluid end assembly 10 at an exterior surface. The fluid end segments 12 in the fluid end assembly 10 are not joined together. The intake manifold 14 and the discharge manifold 16 go into and out of each of the segments 12. The user hooks their flowlines to each end of the manifolds 14 and 16 instead of to the end of the fluid end and suction manifold as is the case with a conventional monoblock 12. This fluid end assembly 10 succeeded in making block failure modular. However, the maintenance and attachment appears to be quite different to frac crews and their maintenance personnel. The separate manifolds 14 and 16 require certain different tools and equipment for service and maintenance. As such, this fluid was only reluctantly received by fracturing personnel. As such, a need developed so as to make a segmented fluid end assembly that is easily maintained with conventional tools and conventional understandings by frac crews and frac personnel.

It is object of the present invention to provide a segmented fluid end assembly that reduces failures.

It is another object the present invention to provide a segmented fluid end assembly that reduces costs.

It is another object of the present invention to provide a segmented fluid end assembly that can be easily repaired.

It is another object of the present invention to provide a segmented fluid end assembly that has a longer life.

It is another object of the present invention to provide a segmented fluid end assembly that gives personnel the ability to replace a cracked or damaged segment.

It is another object of the present invention to provide a segmented fluid end assembly that can be repaired with conventional tools.

It is another object of the present invention to provide a segmented fluid end assembly that reduces downtime for fluid end replacement.

It is still another object of the present invention to provide a segmented fluid end assembly that has no external discharge manifold or piping that is required to be removed for field service.

It is still another object of the present invention to provide a segmented fluid end assembly that eliminates the use of tie rods.

It is still further object of the present invention to provide a segmented fluid end assembly in which the segments can be formed from a partitioned monoblock.

It is still further object of the present invention to provide a segmented fluid end assembly which has additional safeguards against the separation of the segments.

These and other objects and advantages of the present invention will become apparent from a reading of the attached specification and appended claims.

BRIEF SUMMARY OF THE INVENTION

The present invention is a segmented fluid end assembly that comprises a first module and a second module that are joined by a connector received in slots of the first and second module so as to fix the first module to the second module. In particular, the first module has a body with a first side surface. A discharge outlet is formed on the first side surface. A suction orifice is formed on another surface of the body. The first side surface has a slot formed therein and extends along at least a portion of the first side surface. The second module also has a body with a first side surface. The first side surface of the second module faces the first side surface of the first module. The body has a suction orifice formed on another surface of the body of the second module. A discharge outlet is formed on the first side surface of the second module. The discharge outlet of the second module communicates with the discharge outlet of the first module. The body of the second module has a slot formed therein which is generally aligned with the slot of the first module. The connector is received in the slots of the first and second modules so as to fix the first module to the second module.

The slots of the first and second module open at the first side surfaces of the first and second modules. The slots of the first and second modules have an end opening at the another surface of the first and second modules. The slots are tapered so as to have a narrow width inwardly of the end of the slot. In particular, the preferred embodiment the present invention, each of the slots of the first and second modules has a dovetail configuration. The slots of the first and second module open at opposite ends of the bodies of the second first and second modules. The slot of the first module comprises a first slot extending across the first side surface adjacent to a top surface of the body and a second slot extending across the first side surface adjacent a bottom surface of the body. The slots of the second module have a similar configuration.

The connector is in the nature of a wedge received in the slots of the first and second modules. This wedge is removably received in the slots. The wedges particularly comprise a front wedge extending into the slots from a first end of the first and second modules and a rear wedge extending into the slots from a back of the first and second modules. At least one of the front and rear wedges is internally threaded. A fastener can be received in an interior of the first and second wedges. The fastener has threads engaged with the internal threads of the one of the front and rear wedges. In the preferred embodiment of the present invention, the front wedge is a single wedge. The rear wedge comprises a pair of wedges in end-to-end relationship. The rear wedges are internally threaded so that the fastener can be used so as to draw the rear wedges inwardly. The front wedge can have a threaded section or drawbolt bore in order to facilitate removal with the use of a drawbolt. The wedge is engaged in friction-fit relationship in the slots of the first and second modules. The wedge has a generally hourglass cross-section. This hourglass configuration of the wedges conforms to the dovetail configurations of the facing slots.

In the present invention, one or more tie rods can be joined to the fluid end segments. These tie rods would extend parallel to the internal discharge bore of the segmented fluid end assembly and would extend through each of the middle segments and end segments in order to provide an additional joining mechanism. As such, this provides a safeguard (in addition to the wedges) against the separation of the fluid end segments.

DETAILED DESCRIPTION OF THE INVENTION

Figure 2:
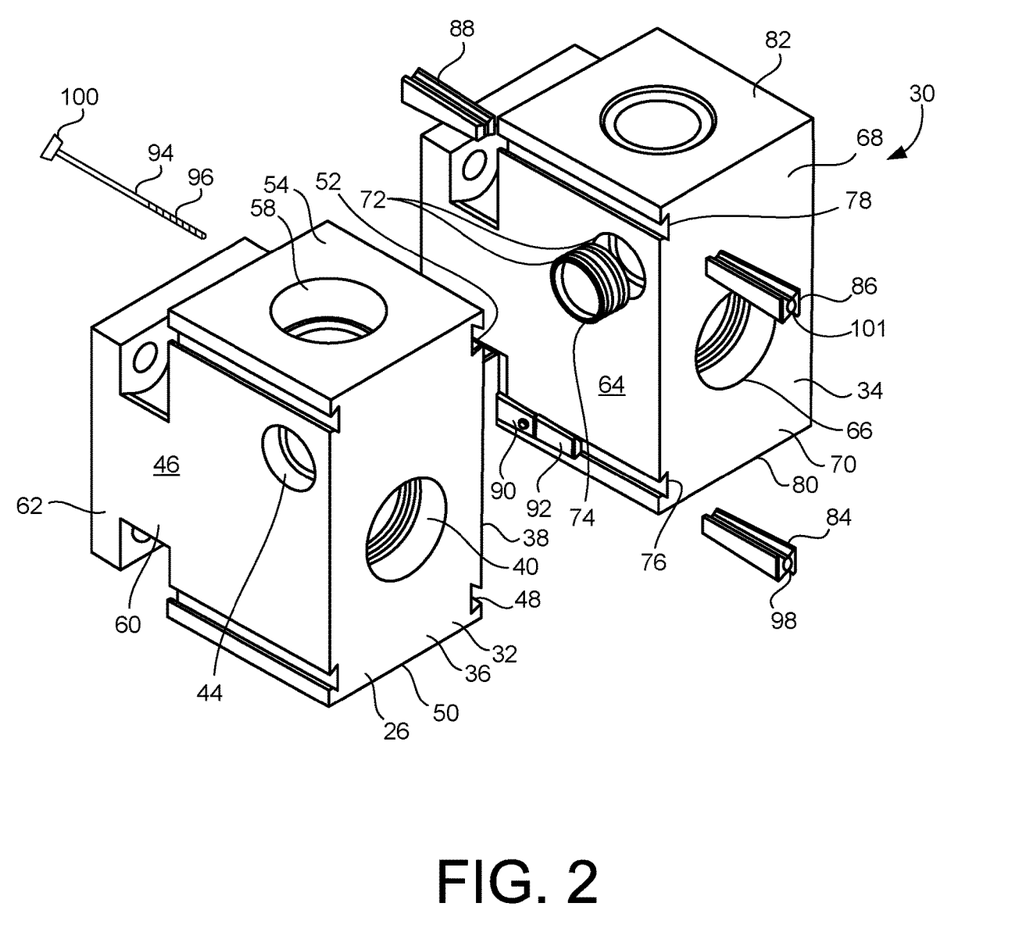
FIG. 2 is an exploded view of the segmented fluid end assembly of the present invention.

FIG. 2 shows the segmented fluid end assembly 30 in accordance with the teachings of the present invention. The segmented fluid end assembly 30 includes a first module 32 and a second module 34. The first module 32 has a body 36 not labeled with a first side surface 38. A suction orifice is formed on the bottom of the body 36 of each module. A discharge outlet 44 is formed on another side surface 46. Access orifice 40 is formed on the front surface 42 of the body 36. The first side surface 38 has a first slot 48 formed adjacent to a bottom 50 of the body 36 and a second slot 52 formed adjacent to a top surface 54 of the body 36. Slots 48 and 52 will extend along at least a portion of the depth of the body 36. A discharge cover orifice 58 opens at the top surface 54. A leg 60 extends from the body 36 rearwardly thereof to a flange 62. Flange 62 is adapted to be coupled to a power end of a high-pressure pump.

The second module 34 has similar configuration to that of the first module 32. In particular, the second module 34 will have a side surface 64 that faces the side surface 38 of the first module 32. The second module 34 also has a suction orifice 66 on a front surface 68 of the body 70 and has a discharge orifice 72 opening through the side surface 64. A discharge seal holder 74 will extend through the discharge openings of the first module 32 and the second module 34 so as to join the discharge openings of the modules in communication.

The second module 34 also includes a first slot 76 and a second slot 78 formed on the side surface 64. The slot 76 is formed adjacent to the bottom 80 of the body 68 of the second module 34. The slot 78 is formed adjacent to the top surface 82 of the body 68 of the second module 34. As can be seen, the slots 76 and 78 are aligned with the slots 48 and 52, respectively. A connector 84 is received in the slots 48 and 76. Another connector 86 is received in the slots 52 and 78. Connector 88 is received in the rearward portions of the slots 52 and 78. A pair of connectors 90 and 92 received in the rearward portion of the slots 48 and 76. Each of the slots 48, 52, 76 and 78 are tapered so as to narrow toward a central portion of the respective slot. In other words, a wide end of the slot will open at the faces of the bodies 36 and 68. Connectors 84, 86, 88, 90 and 92 are in the nature of wedges, each having a generally hourglass cross-section. In other words, these wedges will suitably fit within the dovetail-shaped slots 48, 52, 76 and 78.

Connectors 90 and 92 can be threaded. Since connectors 90 and 92 have a relatively short length, they can easily be installed on the rear face of each of the bodies. The space provided by leg 60 relative to flange 62 will allow each of the relatively short connectors 90 and 92 to be inserted into the space. If there is enough room for a longer wedge, the pair of connectors 90 and 92 can be replaced with a single connector. When a pair of connectors 90 and 92 are used, a fastener 94 having a threaded portion 96 can be inserted through an internally threaded passage of the respective wedges. The fastener 94, in the nature of a bolt, will have a conventional head 100 that can be rotated so as to draw the wedges toward each other within the tapered slot. The fastener 94 can be inserted so that the threads 96 engage with the internal threads formed in the wedges 90 and 92. As such, as the fastener 94 is rotated, the wedges 90 and 92 will be drawn to each other within the slots 48 and 76 so as to be securely affixed between the modules 32 and 34.

In those circumstances in which an adequate amount of space is provided between the module and the rearward flange, the wedges can simply be hammered or otherwise forcibly urged into the tapered slots.

It can be seen in FIG. 2 that the connectors 84 and 86 have threaded sections 98 and 101. After the connectors 84 and 96 are forcibly introduced into the tapered slots, it may be necessary to ultimately remove the wedges in order to replace the module. As such, the threaded sections 98 and 101 are provided so as to act as a drawbolt bores. As such, a drawbolt can be inserted into each of these threaded sections 98 and 101 so as to facilitate the removal of the wedges from the respective slots. The other connectors can also have a similar threaded section or drawbolt bore.

Within the concept of the present invention, the slots can be tapered or the wedges can be tapered, or both. Ultimately, the connector serves to establish a friction-fit within each of the slots so as to firmly secure the bodies 36 and 68 of the modules 32 and 34 together. The threading of the wedges provides a ready means for drawing the wedges 90 and 92 out for disassembly.

Figure 3:
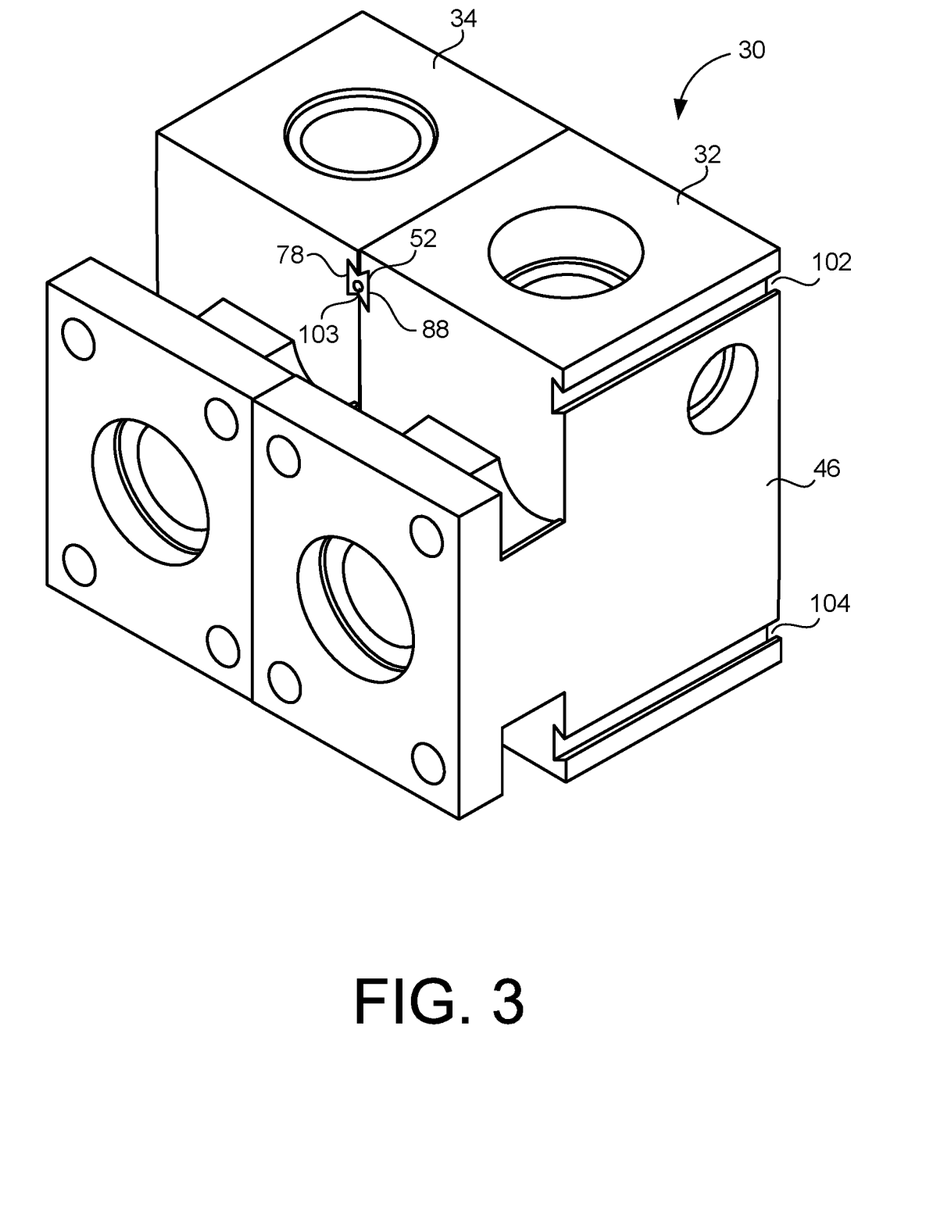
FIG. 3 is a perspective view of the segmented fluid end assembly showing two segments as joined together.

FIG. 3 shows the modules 32 and 34 as joined in side-by-side relationship. In particular, it can be seen that the wedge 88 is received within the respective slots 78 and 52. The threaded section 103 (or drawbolt bore) is shown as positioned centrally of the wedge 88. The wedge 88 has a generally hourglass configuration so as to conform with the dovetail configurations of each of the slots 52 and 78. The other wedges will have a similar configuration. It can be seen that the first module 32 also has slots 102 and 104 formed on side surface 46. These can be used so as to join the first module 32 to another module.

Figure 4:
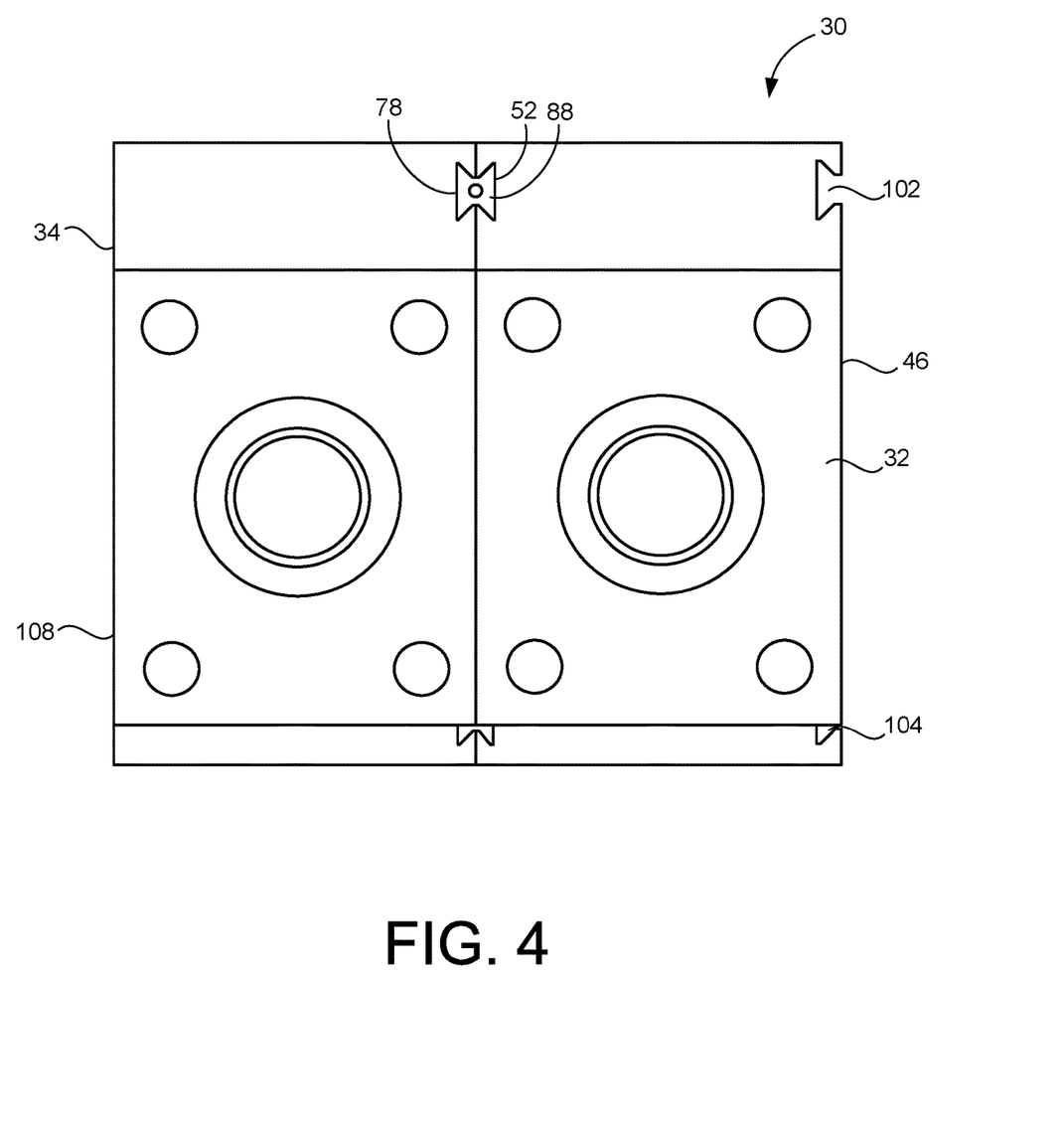
FIG. 4 is a rearward elevational view of the segmented fluid end assembly of the present invention with the segments joined together.

FIG. 4 is an end view of the segmented fluid end assembly 30 of the present invention. As can be seen, the module 34 is an end module of the assembly. In other words, there are no slots formed on the side surface 108 of the module 34. The first module 32 can be joined to additional modules. As such, the slots 102 and 104 are shown as located on the side 46 of the first module 32. The connector 88 is illustrated as received within the slots 78 and 52 in the manner described herein previously.

The present invention utilizes a different method of attaching the segmented modules through the use of the specially-design tapered wedges and tapered wedge slots. As such, the flowlines can be attached in the nature of conventional monoblock fluid ends. To the maintenance personnel and field crews, the fluid end assembly of the present invention will appear to be similar to that of existing fluid end assemblies. They will be attached in exactly the same way and do not require additional tools or equipment. The segments can be easily removed from each other so as to lower repair and replacement costs when a segment fails. The present invention avoids the need for the entire block being scrapped. The present invention avoids the use of a separate manifold. Tie rods linking segments together are no longer required in the present invention. As such, the present invention achieves advantages over that of the prior art.

In the preferred embodiment of the present invention, the fluid end segments are manufactured from new forgings. However, experiments with the present invention have shown that the fluid end segments can be created by partitioning a used for scrap monoblock fluid end into segments. The slots can be suitably formed and then the segments can be joined together with the wedge lock of the present invention. The present invention can utilize a one piece wedge in both the front side and the rear side of the fluid end segment where the geometry of the segments that are used allow sufficient access to the wedge slots. Alternatively, a pair of wedge segments can be utilized where there is not sufficient access to the wedge slots at the rear side of the fluid end segment. In one embodiment of the present invention, the wedges can include an internal drawbolt bore so as to facilitate wedge removal.

As an additional safeguard, one or more tie rods can be arranged parallel to the internal discharge bore of the segmented fluid end assembly. This tie rod would extend through each of the middle segments and end segments to provide an additional joining mechanism. The tie rod provides the additional safeguard in the unlikely event that the wedge lock arrangement should fail or that the fluid end segments would separate.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A segmented fluid end assembly comprising:
    a first module having a body with a first side surface, said body having a suction orifice formed on another surface of said body, said first module having a discharge outlet formed on the first side surface, the first side surface having a slot formed therein and extending along at least a portion of the first side surface;
    a second module having a body with a first side surface, the first side surface of the second module facing the first side surface of said first module, said body having a suction orifice formed at another surface, said second module having a discharge outlet formed on the first side surface of said second module, said discharge outlet of said second module communicating with the discharge outlet of said first module, said body of said second module having a slot formed in the first side surface of said second module therein generally aligned with the slot of said first module, the slots of said first and second modules opening at the first side surfaces of said first and second modules, the slots of said first and second modules having an end opening at the another surface of said first and second modules, the slots are tapering so as to narrow in width inwardly of the end thereof, each of the slots of said first and second modules having a dovetail configuration; and
    a connector received in said slots of the first and second modules so as to fix said first module against said second module.

2. The segmented fluid end assembly of claim 1, wherein the slot of said first module comprises a first slot extending across the first side surface adjacent a top surface of said body and a second slot extending across the first side surface adjacent a bottom surface of said body.

3. The segmented fluid end assembly of claim 1, wherein said connector is a wedge engaged in friction-fit relationship in the slots of said first and second modules.

4. The segmented fluid end assembly of claim 1, further comprising:
    a plurality of additional modules each having a configuration of said first module, the plurality of modules arranged in side-by-side relationship.

5. A segmented fluid end assembly comprising:
    a first module having a body with a first side surface, said body having a suction orifice formed on another surface of said body, said first module having a discharge outlet formed on the first side surface, the first side surface having a slot formed therein and extending along at least a portion of the first side surface;
    a second module having a body with a first side surface, the first side surface of the second module facing the first side surface of said first module, said body having a suction orifice formed at another surface, said second module having a discharge outlet formed on the first side surface of said second module, said discharge outlet of said second module communicating with the discharge outlet of said first module, said body of said second module having a slot formed in the first side surface of said second module therein generally aligned with the slot of said first module; and
    a connector received in said slots of the first and second modules so as to fix said first module against said second module, wherein the connector is a wedge received in the slots of said first and second modules.

6. The segmented fluid end assembly of claim 5, wherein the wedge is removably received in the slots of said first and second modules.

7. The segmented fluid end assembly of claim 6, wherein the wedge comprises a front wedge extending into the slots from a front of said first and second modules and a rear wedge extending into the slots from a rear of said first and second modules.

8. The segmented fluid end assembly of claim 7, wherein at least one of the front and rear wedges is internally threaded, the segmented fluid end assembly further comprising:
    a fastener received in an interior of the at least one of the front and rear wedges, said fastener having threads engaged with the internal threads of the at least one of the front and rear wedges.

9. The segmented fluid end assembly of claim 8, wherein each of the front and rear wedges is internally threaded.

10. A segmented fluid end assembly comprising:
    a first module having a body with a first side surface, said body having a suction orifice formed on another surface of said body, said first module having a discharge outlet formed on the first side surface, the first side surface having a slot formed therein and extending along at least a portion of the first side surface;
    a second module having a body with a first side surface, the first side surface of said second module facing the first side surface of said first module, said body having a suction orifice formed at another surface, said second module having a discharge outlet formed on the first side surface of said second module, said discharge outlet of said second module communicating with the discharge outlet of said first module, said body of said second module having a slot formed therein that is generally aligned with the slot of said first module; and
    a wedge received in the slots of said first and second modules so as to fix said first module against said second module.

11. The segmented fluid end assembly of claim 10, wherein said wedge comprises a front wedge extending into the slots from a front of said first and second modules and a rear wedge extending into the slots from a rear of said first and second modules.

12. The segmented fluid end assembly of claim 11, wherein at least one of the front and rear wedges is internally threaded, the segmented fluid end assembly further comprising:
    a fastener received in an interior of the at least one of the front and rear wedges, said fastener having threads engaged with the internal threads of the at least one of the front and rear wedges.

13. The segmented fluid end assembly of claim 10, wherein said wedge is engaged in friction-fit relationship in the slots of said first and second modules.

14. The segmented fluid end assembly of claim 10, wherein the slot of said first module comprises a first slot extending across the first side surface adjacent a top surface of said body and a second slot extending across the first side surface adjacent a bottom surface of said body, said wedge comprising a first wedge received in the first slot and a second wedge received in the second slot.

15. The segmented fluid end assembly of claim 10, further comprising:
   a plurality of additional modules each having a configuration of said first module, the plurality of modules arranged in side-by-side relationship.

\* \* \* \* \*